A. CHMIELEWSKI.
AUTOMOBILE LOCK.
APPLICATION FILED JUNE 13, 1921.

1,414,255.

Patented Apr. 25, 1922.
2 SHEETS—SHEET 1

Inventor
Alex Chmielewski
By his Attorney
George C. Heinitz

A. CHMIELEWSKI.
AUTOMOBILE LOCK.
APPLICATION FILED JUNE 13, 1921.
1,414,255.
Patented Apr. 25, 1922.
2 SHEETS—SHEET 2.
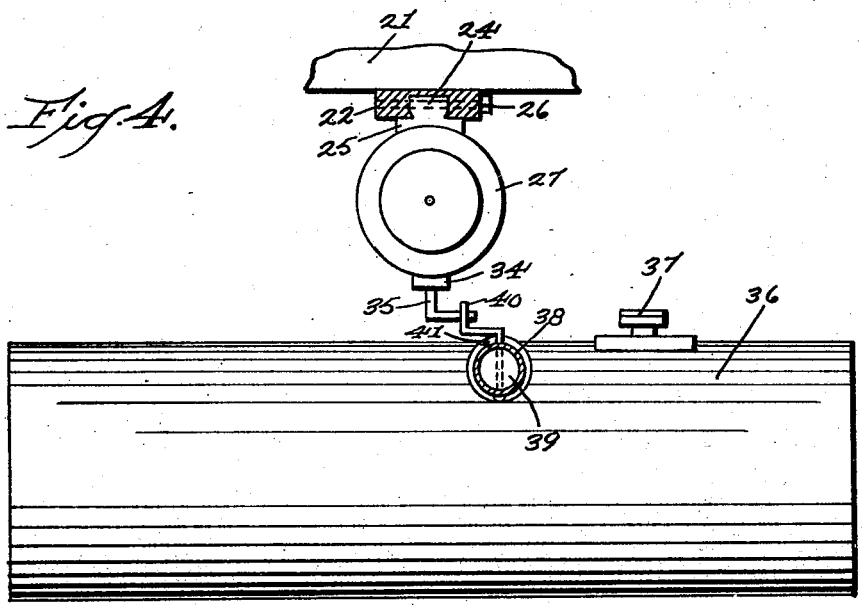
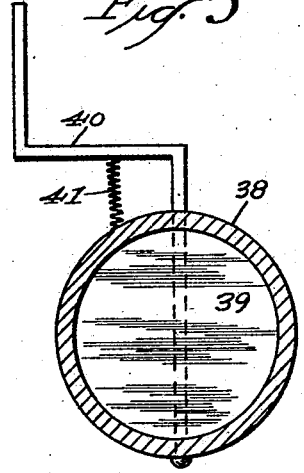
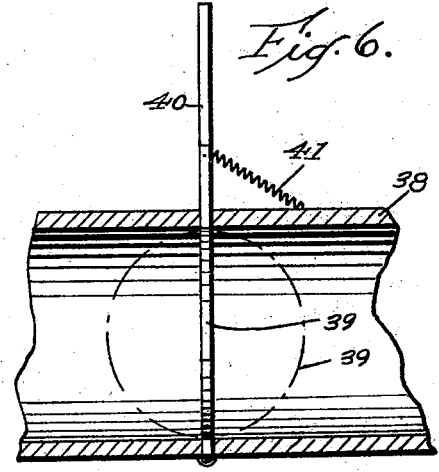
Inventor
Alex Chmielewski
By his Attorney
George C. Heinitz

UNITED STATES PATENT OFFICE.

ALEX CHMIELEWSKI, OF TERRYVILLE, CONNECTICUT.

AUTOMOBILE LOCK.

1,414,255.  Specification of Letters Patent.  Patented Apr. 25, 1922.

Application filed June 13, 1921. Serial No. 477,127.

*To all whom it may concern:*

Be it known that I, ALEX CHMIELEWSKI, a citizen of Poland, residing at Terryville, county of Litchfield, and State of Connecticut, have invented certain new and useful Improvements in Automobile Locks, of which the following is a specification.

This invention relates to improvements in mechanically operated devices for preventing the theft of automobiles and motor cars in general.

It is the principal object of the invention to provide a device of this class which is automatically stopping the supply of gas to the engine if a person, other than the owner or authorized driver of the vehicle is trying to operate the machine.

Another object of the invention is the provision of a device of this character which is of a simple and therefore inexpensive construction and which may be readily applied to any automobile of standard type.

A further object of the invention is the provision of a device of this type which is capable of adjustment in accordance with the predetermined weight of the driver authorized to operate the car.

These and other objects of the invention will become more fully apparent as the description proceeds, and will then be more specifically pointed out in the appended claims.

In the accompanying drawings, forming a material part of this disclosure:

Figure 4 is a side view of an automobile fuel tank and combined elements partly in section on line 4—4 of Figure 2.

Figure 5 is a transverse section through the feed pipe showing the butterfly valve closed, and Figure 6 is a longitudinal section through the feed pipe showing the butterfly valve open.

Figure 1:
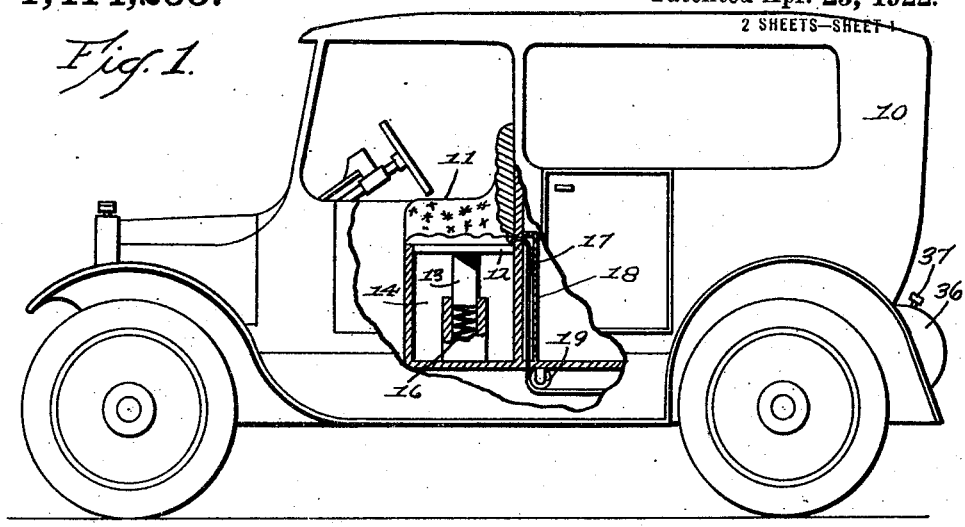
Figure 1 is a side view of an automobile equipped with the device constructed according to the present invention, partly in section.
Figure 2:
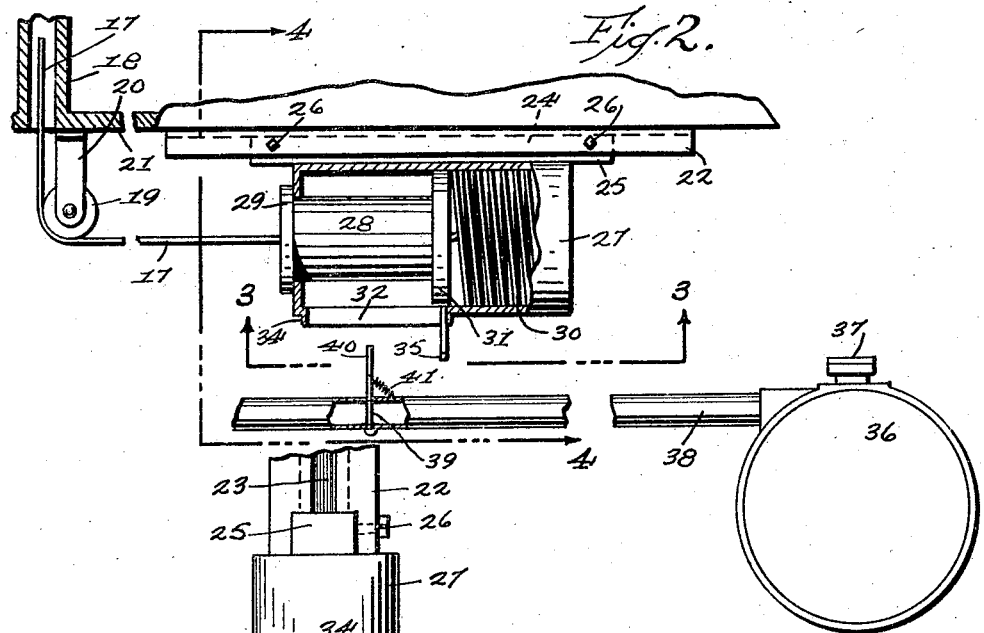
Figure 2 is a side view of an auxiliary cylinder attached to the bottom of a car and the feed pipe valve co-operating therewith.
Figure 3:
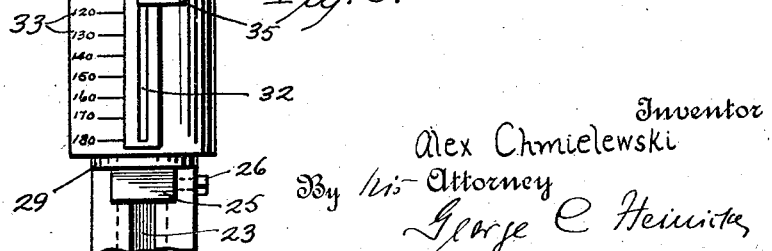
Figure 3 is a bottom plan view of the auxiliary cylinder taken along line 3—3 of Fig. 2.

An automobile 10 of any approved type and construction having a seat 11 provided with a movable base plate 12, has a piston 13 arranged within a chamber 14 under the seat. This piston is working in a vertical cylinder 15 and between the bottom of said cylinder and piston a strong spring 16 is provided allowing up and down movement of the plate 12 within certain limits.

To the rear edge of the plate 12, one end of a cable 17 is attached which is guided through a chamber 18 and the bottom of the car and over a guide roller 19 journaled in the lower ends of a hanger 20 secured with its upper end to the car bottom 21.

To this bottom 21 is also secured a bracket 22 having a dove-tailed groove 23 in which is engaged a bar 24 of dove-tailed cross section, and having a base 25. This bar 24 can be adjusted to any position within the groove and can be locked in this position by means of a number of bolts 26.

Integrally made with the base 25 is an auxiliary cylinder 27 in which a piston 28 is working, to the outer flange 29 of which the end of cable 17 is fastened. A strong spring 30 is secured with one end to the inner flange 31 of the piston 28, while its other end is resting against the inner face of the end wall of the cylinder.

The cylinder 27 is provided at its lower face with a longitudinal slot 32 along which a graduation is shown designated generally 33. It will be clear that said graduation may be differently numbered, and that the graduation shown is only an example representing the average weights of persons.

In this slot 32, which is surrounded on the outside of the cylinder 27 by a raised slotted block 34, an angular finger 35 is reciprocating, attached to the flange 31.

The customary fuel or gasoline tank 36 with filler cap 37 is provided with a feed pipe 38 in which a butterfly valve 39 is arranged having its angular stem 40 extending out of and above the pipe 38 into the path of finger 35. A spring 41 is provided which keeps the valve 39 normally closed.

The device operates as follows:

After the weight of the person authorized to drive the automobile or car has been determined, (in the present instance 150 pounds) the length of the cable 17 and the position of the auxiliary cylinder are adjusted so that the index finger 35 indicates on the scale 33 this weight and the end of the cable is fastened to the seat 12. In this position, the finger 35 will be in the path of the valve operating stem 40 and engage the same to hold the valve open to feed fuel from the tank to the engine.

If now the driver leaves his seat, the spring 30 will draw flange 31 of piston 28 and finger 35 out of engagement with the stem 40, and the valve 39 will be closed under the action of the spring 41 when now a person of less weight than 150 pounds occupies the seat and tries to start the engine, the finger 35 will not engage the stem 40 and no fuel will be fed to the engine and the valve will remain closed. If however a person of a greater weight than 150 pounds takes the seat and attempts to operate the car, the finger 35 will open the valve for an instant, will however not keep it in this position but pass it, and the valve will close automatically, so that any person of a greater weight than 150 pounds will not be able to start the engine and drive away with the car.

Having thus described my invention, what I claim as new and desire to protect by a United States Patent is:

1. A device of the class described, comprising an auxiliary cylinder, a butterfly valve in the fuel feed pipe of a car, means connected with said cylinder for automatically opening said valve upon the occupation of the seat of a car by a person having a predetermined weight, and means for allowing an adjustment of said valve opening means according to the weight of the driver.

2. A device of the class described, comprising an auxiliary cylinder adapted to be adjustably secured to the bottom of a car, a spring controlled means reciprocating in said cylinder and having a projecting member, a fuel feed controlling means having an element projecting into the path of said projecting member for controlling the fuel supply, a movable seat and means connecting said seat with said reciprocating means, said reciprocating means being adjustable to engage said fuel controlling means when a person of a predetermined weight is occupying the driver's seat.

3. A device of the class described, comprising an auxiliary cylinder adapted to be adjustably secured to the bottom of a car, a spring controlled piston working in said cylinder, a seat having a movable base, means connecting said base with said piston, an operating arm on said piston extending to the outside of said cylinder, a butterfly valve within the fuel feed pipe of a car, a stem on said valve extending out of said feed pipe into the path of said operating arm, and means for adjusting the point of engagement between said arm and stem in accordance with the weight of the person to occupy the driver's seat.

4. A device of the class described comprising a vertically reciprocating spring controlled base for a car seat, an auxiliary cylinder having a longitudinal slot, a spring controlled piston working in said cylinder, a cable connecting said base with said piston, means for guiding said cable, a member secured to said piston projecting from the cylinder through the slot thereof, a graduation near said slot, and means for adjusting the position of said cylinder with respect to the car bottom, a butterfly valve within the fuel feed pipe of the car and a stem on said valve projecting into the path of said projecting member.

In testimony whereof I have affixed my signature.

ALEX CHMIELEWSKI.